(12) United States Patent
Koren et al.

(10) Patent No.: US 11,132,258 B2
(45) Date of Patent: Sep. 28, 2021

(54) IN-PLACE RAID CONVERSION SYSTEM AND METHOD

(71) Applicant: EMC IP Holding Company, LLC, Hopkinton, MA (US)

(72) Inventors: Roy Koren, Kfar Saba (IL); Yair Hershkovitz, Netanya (IL); Vladimir Shveidel, Pardes-Hana (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 160 days.

(21) Appl. No.: 16/263,767

(22) Filed: Jan. 31, 2019

(65) Prior Publication Data
US 2020/0250037 A1    Aug. 6, 2020

(51) Int. Cl.
| | |
|---|---|
| *G06F 12/00* | (2006.01) |
| *G06F 13/00* | (2006.01) |
| *G06F 13/28* | (2006.01) |
| *G06F 11/10* | (2006.01) |
| *G06F 3/06* | (2006.01) |

(52) U.S. Cl.
CPC ........ *G06F 11/1096* (2013.01); *G06F 3/0607* (2013.01); *G06F 3/0632* (2013.01); *G06F 3/0689* (2013.01); *G06F 2211/1004* (2013.01)

(58) Field of Classification Search
CPC ...... G06F 3/06; G06F 3/0689; G06F 11/1076; G06F 11/1662
USPC ........................................................ 711/114
See application file for complete search history.

(56) References Cited

U.S. PATENT DOCUMENTS

2019/0317889 A1*   10/2019   Chang .................. G06F 12/023

OTHER PUBLICATIONS

What is RAID 6 (Redundant Array of Independent Disks)?, TechTarget, https://searchstorage.techtarget.com/definition/RAID-6-redundant-array-of-independent-disks (Year: 2015).*

* cited by examiner

*Primary Examiner* — Edward J Dudek, Jr.
*Assistant Examiner* — Sidney Li
(74) *Attorney, Agent, or Firm* — Brian J. Colandreo; Mark H. Whittenberger; Holland & Knight LLP

(57) ABSTRACT

A method, computer program product, and computing system for receiving a request to reconfigure a data array that currently includes N data drives and P parity drives to include N data drives and P+1 parity drives; confirming the availability of the P+1 parity drive; and distributing a plurality of new parity portions across the N data drives and P+1 parity drives.

20 Claims, 3 Drawing Sheets

IN-PLACE RAID CONVERSION SYSTEM AND METHOD

TECHNICAL FIELD

This disclosure relates to conversion systems and methods and, more particularly, to conversion systems and methods for use within RAID data storage systems.

BACKGROUND

In today's IT infrastructure, high availability is of paramount importance. Specifically, critical (and sometimes non-critical) components within an IT infrastructure are often layered in redundancy. For example, primary servers may be supported by backup servers; primary switches may be supported by backup switches; primary power supplies may be supported by backup power supplies; and primary storage systems may be supported by backup storage systems. Additionally, individual disk drives are often coupled and interconnected to form high-availability data arrays. When designing such high availability devices, flexibility concerning the manner in which these devices are configured is highly important.

SUMMARY OF DISCLOSURE

In a first implementation, a computer-implemented method is executed on a computing device includes: receiving a request to reconfigure a data array that currently includes N data drives and P parity drives to include N data drives and P+1 parity drives; confirming the availability of the P+1 parity drive; and distributing a plurality of new parity portions across the N data drives and P+1 parity drives.

One or more of the following features may be included. Receiving a request to reconfigure a data array that currently includes N data drives and P parity drives to include N data drives and P+1 parity drives may concern reconfiguring a RAID 5 data array to a RAID 6 data array. The RAID 5 data array may include N data drives and one parity drive and the RAID 6 data array includes N data drives and two parity drives. Distributing a plurality of new parity portions across the N data drives and P+1 parity drives may include: maintaining a first new parity portion, chosen from the plurality of new parity portions, on the P+1 parity drive within a first RAID stripe of a RAID stripe set; and relocating the remaining new parity portions, chosen from the plurality of new parity portions, across the N data drives and P parity drives within the remaining RAID stripes of the RAID stripe set. Maintaining a first new parity portion, chosen from the plurality of new parity portions, on the P+1 parity drive within a first RAID stripe of a RAID stripe set may include: calculating the first new parity portion for the first RAID stripe of the RAID stripe set; and storing the first new parity portion for the first RAID stripe of the RAID stripe set on the P+1 parity drive. Relocating the remaining new parity portions, chosen from the plurality of new parity portions, across the N data drives and P parity drives within the remaining RAID stripes of the RAID stripe set may include copying data currently stored on a specific drive, chosen from the N data drives and P parity drives, within a specific RAID stripe of the RAID stripe set to the P+1 parity drive of the specific RAID stripe. Relocating the remaining new parity portions, chosen from the plurality of new parity portions, across the N data drives and P parity drives within the remaining RAID stripes of the RAID stripe set further may include: calculating a specific new parity portion for the specific RAID stripe of the RAID stripe set; and storing the specific new parity portion for the specific RAID stripe of the RAID stripe set on the specific drive.

In another implementation, a computer program product resides on a computer readable medium and has a plurality of instructions stored on it. When executed by a processor, the instructions cause the processor to perform operations including: receiving a request to reconfigure a data array that currently includes N data drives and P parity drives to include N data drives and P+1 parity drives; confirming the availability of the P+1 parity drive; and distributing a plurality of new parity portions across the N data drives and P+1 parity drives.

One or more of the following features may be included. Receiving a request to reconfigure a data array that currently includes N data drives and P parity drives to include N data drives and P+1 parity drives may concern reconfiguring a RAID 5 data array to a RAID 6 data array. The RAID 5 data array may include N data drives and one parity drive and the RAID 6 data array includes N data drives and two parity drives. Distributing a plurality of new parity portions across the N data drives and P+1 parity drives may include: maintaining a first new parity portion, chosen from the plurality of new parity portions, on the P+1 parity drive within a first RAID stripe of a RAID stripe set; and relocating the remaining new parity portions, chosen from the plurality of new parity portions, across the N data drives and P parity drives within the remaining RAID stripes of the RAID stripe set. Maintaining a first new parity portion, chosen from the plurality of new parity portions, on the P+1 parity drive within a first RAID stripe of a RAID stripe set may include: calculating the first new parity portion for the first RAID stripe of the RAID stripe set; and storing the first new parity portion for the first RAID stripe of the RAID stripe set on the P+1 parity drive. Relocating the remaining new parity portions, chosen from the plurality of new parity portions, across the N data drives and P parity drives within the remaining RAID stripes of the RAID stripe set may include copying data currently stored on a specific drive, chosen from the N data drives and P parity drives, within a specific RAID stripe of the RAID stripe set to the P+1 parity drive of the specific RAID stripe. Relocating the remaining new parity portions, chosen from the plurality of new parity portions, across the N data drives and P parity drives within the remaining RAID stripes of the RAID stripe set further may include: calculating a specific new parity portion for the specific RAID stripe of the RAID stripe set; and storing the specific new parity portion for the specific RAID stripe of the RAID stripe set on the specific drive.

In another implementation, a computing system includes a processor and memory is configured to perform operations including: receiving a request to reconfigure a data array that currently includes N data drives and P parity drives to include N data drives and P+1 parity drives; confirming the availability of the P+1 parity drive; and distributing a plurality of new parity portions across the N data drives and P+1 parity drives.

One or more of the following features may be included. Receiving a request to reconfigure a data array that currently includes N data drives and P parity drives to include N data drives and P+1 parity drives may concern reconfiguring a RAID 5 data array to a RAID 6 data array. The RAID 5 data array may include N data drives and one parity drive and the RAID 6 data array includes N data drives and two parity drives. Distributing a plurality of new parity portions across the N data drives and P+1 parity drives may include:

maintaining a first new parity portion, chosen from the plurality of new parity portions, on the P+1 parity drive within a first RAID stripe of a RAID stripe set; and relocating the remaining new parity portions, chosen from the plurality of new parity portions, across the N data drives and P parity drives within the remaining RAID stripes of the RAID stripe set. Maintaining a first new parity portion, chosen from the plurality of new parity portions, on the P+1 parity drive within a first RAID stripe of a RAID stripe set may include: calculating the first new parity portion for the first RAID stripe of the RAID stripe set; and storing the first new parity portion for the first RAID stripe of the RAID stripe set on the P+1 parity drive. Relocating the remaining new parity portions, chosen from the plurality of new parity portions, across the N data drives and P parity drives within the remaining RAID stripes of the RAID stripe set may include copying data currently stored on a specific drive, chosen from the N data drives and P parity drives, within a specific RAID stripe of the RAID stripe set to the P+1 parity drive of the specific RAID stripe. Relocating the remaining new parity portions, chosen from the plurality of new parity portions, across the N data drives and P parity drives within the remaining RAID stripes of the RAID stripe set further may include: calculating a specific new parity portion for the specific RAID stripe of the RAID stripe set; and storing the specific new parity portion for the specific RAID stripe of the RAID stripe set on the specific drive.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
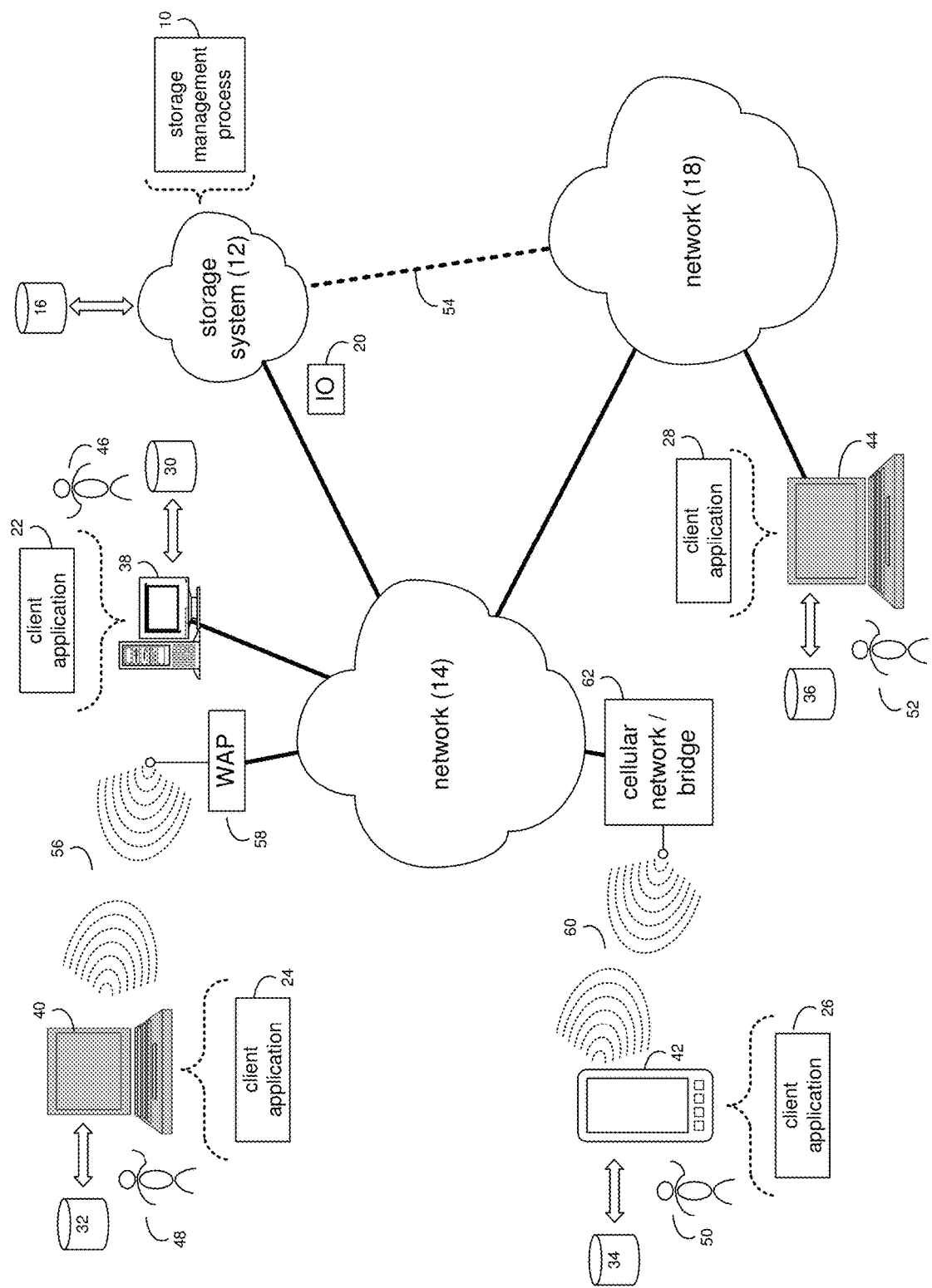
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
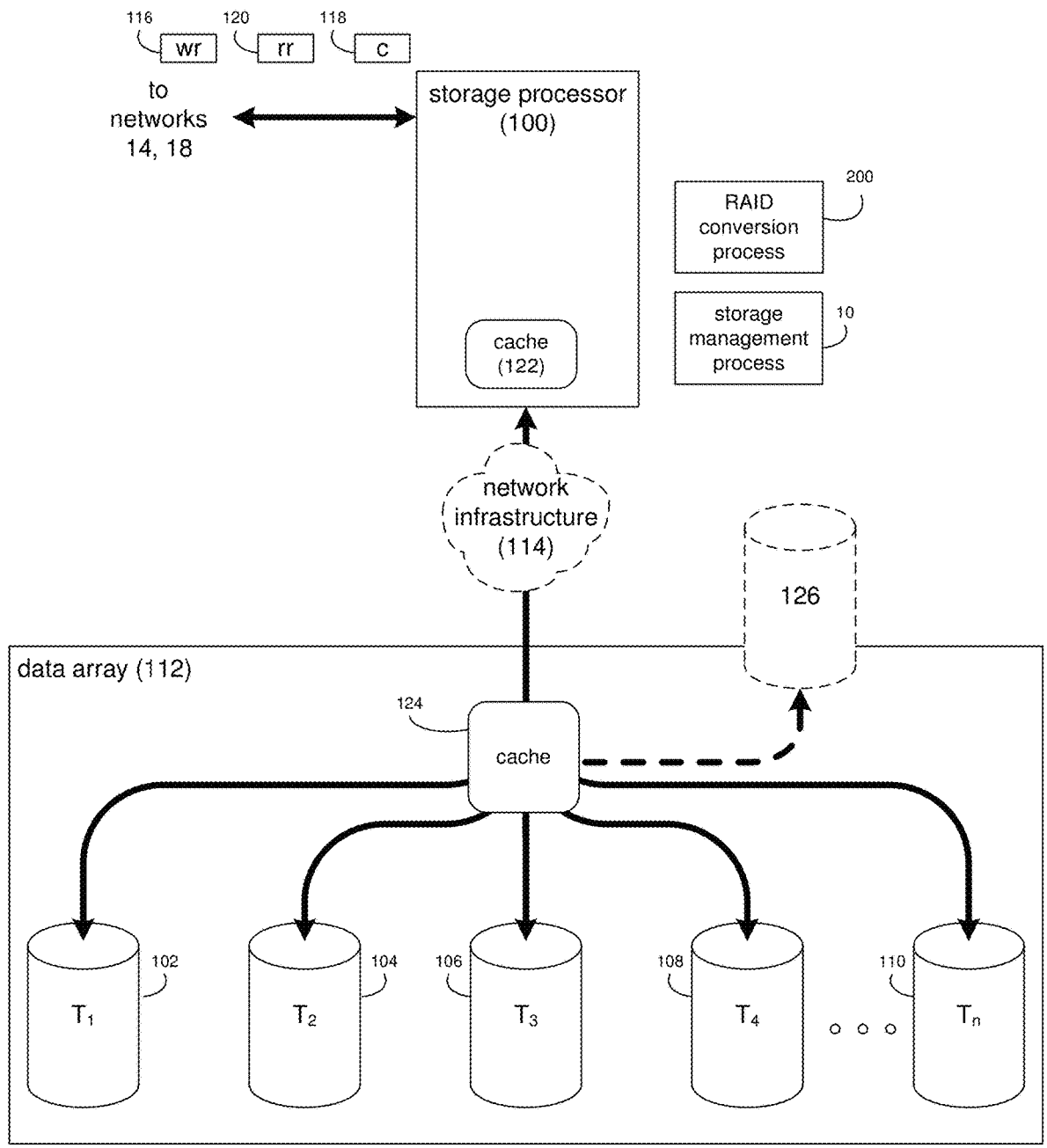
FIG. 2 is a diagrammatic view of another implementation of the storage system of FIG. 1.

Referring also to FIG. 2, there is shown one particular implementation of storage system 12. Storage system 12 may include storage processor 100 and a plurality of storage targets $T_{1-n}$ (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID (Redundant Array of Independent Disks) array.

As is known in the art, RAID is a data storage virtualization technology that combines multiple physical disk drive components into one or more logical units for the purposes of high availability, high performance, or both. This is in contrast to the previous concept of highly reliable mainframe disk drives referred to as "single large expensive disk" (SLED). Data is distributed across the drives in one of several ways, referred to as RAID levels, depending on the required level of high availability and performance. The different schemes (or data distribution layouts) are named by the word "RAID" followed by a number (e.g., RAID 0 or RAID 1). Each scheme (or RAID level), provides a different balance among the key goals: reliability, availability, performance, and capacity. RAID levels greater than RAID 0 provide protection against unrecoverable sector read errors, as well as against failures of whole physical drives.

In a RAID 0 array, data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6, RAID 50 and/or RAID 60 array.

Accordingly, one or more of storage targets 102, 104, 106, 108, 110 may be configured to store coded (e.g., parity) data. As is known in the art, coded (e.g., parity) data may allow for the regeneration of data lost/corrupted on one or more of storage targets 102, 104, 106, 108, 110.

RAID 5 Versus RAID 6:

As is known in the art, a RAID 5 array uses disk striping with parity. Because data and parity are striped evenly across all of the drives in the array, no single drive is a bottleneck. Striping also allows users to reconstruct data in case of a drive failure. Additionally, RAID 5 evenly balances reads and writes, and is currently one of the most commonly used RAID configurations. RAID 5 has more usable storage than RAID 1 and RAID 10 configurations, and provides performance equivalent to RAID 0. RAID 5 arrays use a single hard disk drive for parity information and require a minimum of three hard disk drives in total (with no maximum limitation). Because the parity information is spread across all disk drives in the array, RAID 5 is considered to be one of the most secure RAID configurations.

The benefits of RAID 5 primarily come from its combined use of disk striping and parity. Disk striping is the process of storing consecutive segments of data across different storage devices, thus allowing for better throughput and performance. However, disk striping alone does not make an array fault tolerant. Disk striping combined with parity provides RAID 5 with redundancy and reliability. When data is written to a RAID 5 array, the array calculates parity information and writes that parity information into the parity drive. While mirroring maintains multiple copies of data in each volume to use in case of failure, RAID 5 can rebuild a failed drive using the parity data, which is not kept on a fixed single drive (as it is distributed across the data array).

Similar to RAID 5, RAID 6 has speedy reads and writes parity information to multiple drives. Since a RAID 6 array uses two hard disk drives for parity information, a RAID 6 array requires a minimum of four drives in total (with no maximum limitation) rather than the three required by RAID 5. Unlike RAID 5, RAID 6 can withstand two drive failures and provide access to all data even while both drives are being rebuilt. Because of this, RAID 6 is considered to be more secure than RAID 5. Unfortunately, writes are slower on a RAID 6 array than on a RAID 5 array due to the additional parity information calculation.

System Configuration:

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various JO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

As discussed above, a RAID 5 array provides protection from a single drive failure (at the cost of one drive's worth of drive space). Accordingly, if an array needs a usable capacity of N physical drives, a RAID 5 array would require N+1 physical drives, wherein N drives are used for storing data and 1 drive is used for storing parity information. In a RAID 5 array, the parity drive maintains parity information that is a mathematical calculation on the data stored on the N data drives, wherein if one of the N data drives fail, the data contained in the failed drive may be reconstructed from the parity drive and the remaining data drives. However and as discussed above, a RAID 5 array can only withstand a single drive failure and in the event of a failure of two or more drives, the data stored in the data array would not be recoverable.

Each drive in a RAID array is logically divided into data slices, wherein a data slice is a contiguous portion of a drive (that has a predefined/fixed size). Further, a RAID stripe is a set of data slices, one data slice from each drive in the RAID array. Accordingly, a RAID array is composed of RAID stripes.

| RAID Stripe | Drive 0 | Drive 1 | Drive 2 | Drive 3 | Drive 4 |
|---|---|---|---|---|---|
| 0 | Data 0 | Data 1 | Data 2 | Data 3 | P |
| 1 | Data 0 | Data 1 | Data 2 | Data 3 | P |
| 2 | Data 0 | Data 1 | Data 2 | Data 3 | P |
| 3 | Data 0 | Data 1 | Data 2 | Data 3 | P |
| 4 | Data 0 | Data 1 | Data 2 | Data 3 | P |
| 5 | Data 0 | Data 1 | Data 2 | Data 3 | P |
| N | Data 0 | Data 1 | Data 2 | Data 3 | P |

As shown above, this illustrative example of a RAID array is shown to include five drives (i.e., drives 0-4) and N RAID stripes, wherein each RAID stripe includes five data slices (i.e., one from each of the five drives), namely four data slices for storing data (e.g., Data 0, Data 1, Data 2, Data 3) and one data slice for storing parity information (e.g., P). In this illustrative example, all parity information is shown to be stored on a single drive (namely drive 4).

However and in a RAID 5 configuration, the parity information is distributed across all of the drives in the array (as opposed to being stored on a single drive), thus providing various benefits such as wear-leveling and enhanced performance.

| RAID Stripe | Drive 0 | Drive 1 | Drive 2 | Drive 3 | Drive 4 |
|---|---|---|---|---|---|
| 0 | Data 0 | Data 1 | Data 2 | Data 3 | P |
| 1 | P | Data 0 | Data 1 | Data 2 | Data 3 |
| 2 | Data 3 | P | Data 0 | Data 1 | Data 2 |
| 3 | Data 2 | Data 3 | P | Data 0 | Data 1 |
| 4 | Data 1 | Data 2 | Data 3 | P | Data 0 |
| 5 | Data 0 | Data 1 | Data 2 | Data 3 | P |
| N | | | | | |

As shown above, this illustrative example of a RAID 5 array is shown to include five drives (i.e., drives 0-4) and N RAID stripes, wherein each RAID stripe includes five data slices (i.e., one from each of the five drives), namely four data slices for storing data (e.g., Data 0, Data 1, Data 2, Data 3) and one data slice for storing parity information (e.g., P). However, the parity information is distributed across all of the drives in the RAID 5 array, wherein:
   the parity information of RAID stripe 0 is stored on Drive 4;
   the parity information of RAID stripe 1 is stored on Drive 0;
   the parity information of RAID stripe 2 is stored on Drive 1;
   the parity information of RAID stripe 3 is stored on Drive 2;
   the parity information of RAID stripe 4 is stored on Drive 3; and
   the parity information of RAID stripe 5 is stored on Drive 4.

As discussed above, a RAID 5 array provides protection from a single drive failure (at the cost of one drive's worth of drive space), wherein a RAID 6 array provides protection from a double drive failure (at the cost of two drive's worth of drive space). Accordingly and in situation where a higher level of data protection/availability is desired, it may be desirable to add an additional drive to a RAID 5 array so that the additional drive could be used as a second parity drive (as required by a RAID 6 array). Unfortunately, the conversion of a RAID 5 (i.e., single parity) array to a RAID 6 (i.e., double parity) array is not a direct conversion. So in certain implementations, the conversion may require: backing up the data on the RAID 5 array to a remote source: reconfiguring the array from a RAID 5 configuration to a RAID 6 configuration (which destroys all data on the array), and restoring the data from the remote source onto the RAID 6 array. Further and in other implementations, the conversion may involve a data copy operation, wherein data is converted during the copy process. For example, assume that the array has some spare disk space, thus allowing for an internal copy. The system may then allocate a RAID 6 layout within the internal spare disk space, and the system may then copy RAID 5 stripes on top of those RAID 6 stripes, thus effectuating a RAID 5 to RAID 6 conversion that is done internally (i.e., within the storage system).

Figure 3:
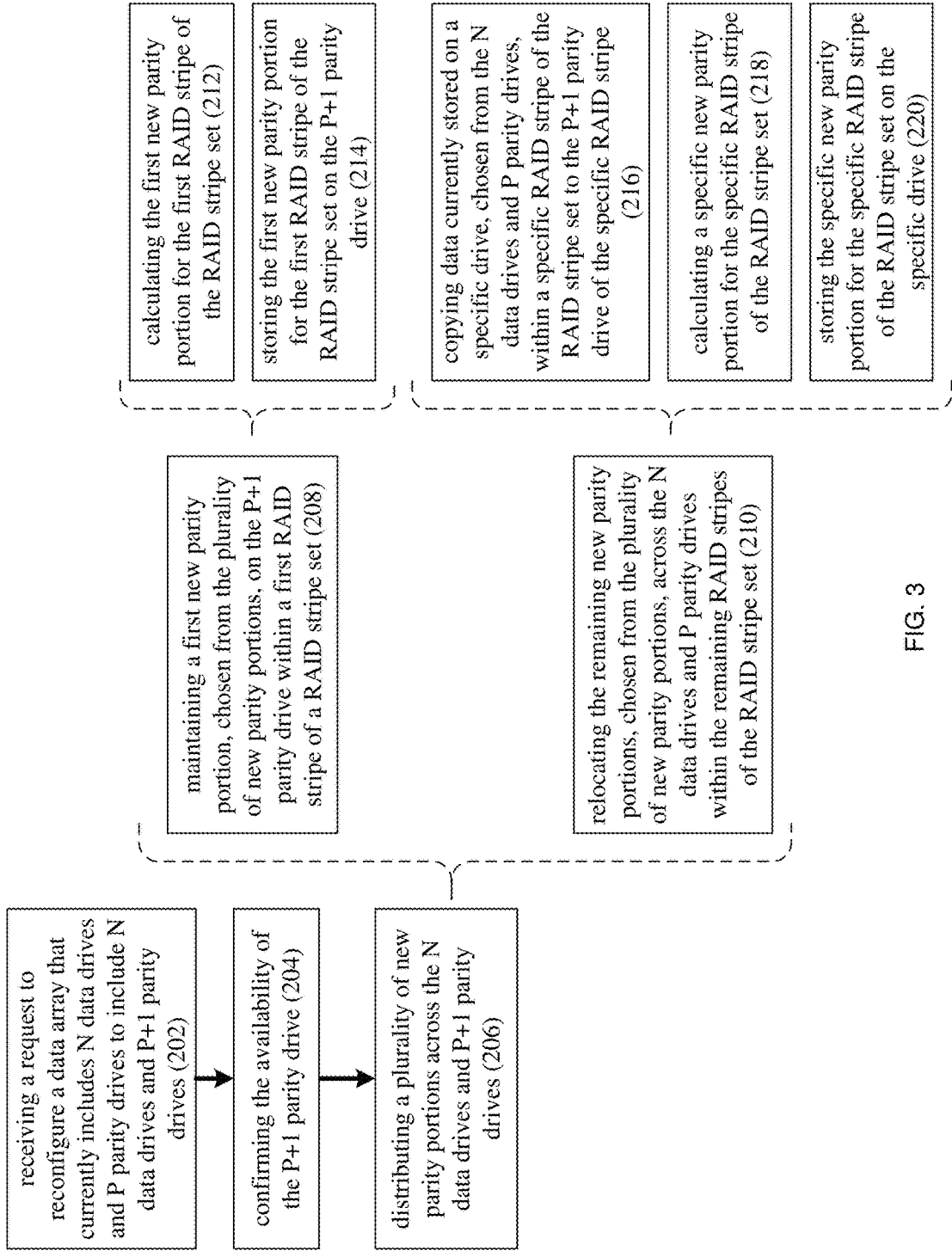
FIG. 3 is a flow chart of the best practices evaluation process of FIG. 1.

RAID Conversion Process:

Referring also to FIG. 3 and as will be discussed below in greater detail, RAID conversion process 200 may be configured to convert a RAID array from a first RAID configuration (having a lower number of parity drives) to a second RAID configuration (having a higher number of parity drives) without requiring the destruction of the data currently stored on the array. For example, RAID conversion process 200 may be configured to convert a RAID 5 array (which uses a single parity drive and can withstand a single drive failure) to a RAID 6 array (which uses two parity drives and can withstand two drive failures) without requiring (as discussed above) the data on the array to be backed up, destroyed, and then restored.

The instruction sets and subroutines of RAID conversion process 200, which may be stored on storage device 16 included within storage system 12, may be executed by one or more processors (not shown) and one or more memory architectures (not shown) included within storage system 12. As discussed above, storage device 16 may include but is not limited to: a hard disk drive; a tape drive; an optical drive; a RAID device; a random access memory (RAM); a read-only memory (ROM); and all forms of flash memory storage devices. Additionally, some or all of the instruction sets and subroutines of RAID conversion process 200 may be executed by one or more processors (not shown) and one or more memory architectures (not shown) included within data array 112.

RAID conversion process 200 may receive 202 a request to reconfigure a data array (e.g., data array 112) that currently includes N data drives and P parity drives to include N data drives and P+1 parity drives. For example, assume that data array 112 within storage system 12 is a RAID 5 array that includes one parity drive and, therefore, can withstand one drive failure. However, assume that an administer (e.g., user 46) of storage system 12 and/or data array 112 wishes to increase the level of availability of data array 112 by reconfiguring data array 112 from being a RAID 5 data array to a RAID 6 data array.

Since RAID 6 arrays use one more parity drive than a RAID 5 array, administrator 46 may be required to designate an additional drive (e.g., storage target 126) for use with data array 112. For example, administrator 46 may add a new drive (e.g., storage target 126) to data array 112 or may designate a drive that is available to data array 112 as being available for (in this example) the RAID 5 to RAID 6 conversion. RAID conversion process 200 may confirm 204 the availability of the P+1 parity drive (e.g., storage target 126, the additional drive needed to convert data array 112 from a RAID 5 configuration to a RAID 6 configuration). Once the P+1 parity drive (e.g., storage target 126) is available, RAID conversion process 200 may distribute 206 a plurality of new parity portions across the N data drives and P+1 parity drives.

Continuing with the example in which data array 112 is configured as a RAID 5 array, data array 112 may appear as follows:

| RAID Stripe | Drive 0 | Drive 1 | Drive 2 | Drive 3 | Drive 4 |
|---|---|---|---|---|---|
| 0 | Data 0 | Data 1 | Data 2 | Data 3 | P |
| 1 | P | Data 0 | Data 1 | Data 2 | Data 3 |
| 2 | Data 3 | P | Data 0 | Data 1 | Data 2 |
| 3 | Data 2 | Data 3 | P | Data 0 | Data 1 |
| 4 | Data 1 | Data 2 | Data 3 | P | Data 0 |
| 5 | Data 0 | Data 1 | Data 2 | Data 3 | P |

As shown above and in the initial RAID 5 configuration of data array 112, data array 112 is shown to include five drives in total, four of which are utilized for storing data (e.g., Data 0, Data 1, Data 2, Data 3) and one of which is utilized for storing parity information (e.g., P). As further discussed above, the parity information (e.g., P) is not all stored on a single drive and is distributed across all of the drives in the RAID array. So moving forward on the premise that RAID conversion process 200 received 202 a request to reconfigure data array 112 from a RAID 5 array to a RAID 6 array and that RAID conversion process 200 confirmed 204 the availability of the P+1 parity drive (e.g., storage target 126), data array 112 may now appear as follows:

| RAID Stripe | Drive0 | Drive1 | Drive2 | Drive3 | Drive4 | Drive5 |
|---|---|---|---|---|---|---|
| 0 | Data 0 | Data 1 | Data 2 | Data 3 | P | Q |
| 1 | P | Data 0 | Data 1 | Data 2 | Data 3 | Q |
| 2 | Data 3 | P | Data 0 | Data 1 | Data 2 | Q |
| 3 | Data 2 | Data 3 | P | Data 0 | Data 1 | Q |
| 4 | Data 1 | Data 2 | Data 3 | P | Data 0 | Q |
| 5 | Data 0 | Data 1 | Data 2 | Data 3 | P | Q |

As shown above, data array 112 now includes six drives (e.g., Drive 0, Drive, 1, Drive 2, Drive 3, Drive 4, Drive 5), wherein the original parity (e.g., P) from the previous RAID 5 configuration is shown distributed across the original five drives (e.g., Drive 0, Drive, 1, Drive 2, Drive 3, Drive 4) and the newly-added Drive 5 (e.g., storage target 126) is shown to include parity placeholders (e.g., Q) for the soon-to-be-calculated parity information that will be utilized in a RAID 6 configuration. Since the soon-to-be-calculated parity information (e.g., Q) for RAID 6 should also be distributed across all of the drives in the data array (e.g., data array 112), RAID conversion process 200 may distribute 206 the plurality of new parity portions (e.g., Q within RAID Stripes 0-5) across the N data drives and P+1 parity drives (e.g., Drive 0, Drive, 1, Drive 2, Drive 3, Drive 4, Drive 5).

When distributing 206 the plurality of new parity portions (e.g., Q within RAID Stripes 0-5) across the N data drives and P+1 parity drives, RAID conversion process 200 may maintain 208 a first new parity portion (e.g., Q within RAID Stripe 0), chosen from the plurality of new parity portions (e.g., Q within RAID Stripes 0-5), on the P+1 parity drive (e.g., Drive 5, namely storage target 126) within a first RAID stripe (e.g., RAID Stripe 0) of a RAID stripe set (e.g., RAID Stripes 0-5). Further and when distributing 206 a plurality of new parity portions (e.g., Q within RAID Stripes 0-5) across the N data drives and P+1 parity drives, RAID conversion process 200 may relocate 210 the remaining new parity portions (e.g., Q within RAID Stripes 1-5), chosen from the plurality of new parity portions (e.g., Q within RAID Stripes 0-5), across the N data drives (e.g., Drives 0-3) and P parity drives (e.g., Drive 4) within the remaining RAID stripes (e.g., RAID Stripes 1-5) of the RAID stripe set (e.g., RAID Stripes 0-5). Accordingly and for one RAID stripe set (e.g., RAID Stripes 0-5), RAID conversion process 200 may spread/distribute the new parity portions (e.g., Q within RAID Stripes 0-5) across all of the drives (e.g., drives 0-5) within data array 112, as shown below:

| RAID Stripe | Drive0 | Drive1 | Drive2 | Drive3 | Drive4 | Drive5 |
|---|---|---|---|---|---|---|
| 0 | Data 0 | Data 1 | Data 2 | Data 3 | P | Q |
| 1 | P | Data 0 | Data 1 | Data 2 | Q | Data 3 |
| 2 | Data 3 | P | Data 0 | Q | Data 2 | Data 1 |
| 3 | Data 2 | Data 3 | Q | Data 0 | Data 1 | P |
| 4 | Data 1 | Q | Data 3 | P | Data 0 | Data 2 |
| 5 | Q | Data 1 | Data 2 | Data 3 | P | Data 0 |

When maintaining 208 a first new parity portion (e.g., Q within RAID Stripe 0), chosen from the plurality of new parity portions (e.g., Q within RAID Stripes 0-5), on the P+1 parity drive (e.g., Drive 5, namely storage target 126) within a first RAID stripe (e.g., RAID Stripe 0) of a RAID stripe set (e.g., RAID Stripes 0-5), RAID conversion process 200 may calculate 212 the first new parity portion (e.g., Q within RAID Stripe 0) for the first RAID stripe (e.g., RAID Stripe 0) of the RAID stripe set (e.g., RAID Stripes 0-5). When calculating 212 the first new parity portion (e.g., Q within RAID Stripe 0), various algorithms may be used by RAID conversion process 200, examples of which may include but are not limited to: dual check data computations (e.g., parity and Reed-Solomon), orthogonal dual parity check data, and diagonal parity.

Once the first new parity portion (e.g., Q within RAID Stripe 0) is calculated 212, RAID conversion process 200 may store 214 the first new parity portion (e.g., Q within RAID Stripe 0) for the first RAID stripe (e.g., RAID Stripe 0) of the RAID stripe set (e.g., RAID Stripes 0-5) on the P+1 parity drive (e.g., Drive 5, namely storage target 126).

When relocating 210 the remaining new parity portions (e.g., Q within RAID Stripes 1-5), chosen from the plurality of new parity portions (e.g., Q within RAID Stripes 0-5), across the N data drives (e.g., Drives 0-3) and P parity drives (e.g., Drive 4) within the remaining RAID stripes (e.g., RAID Stripes 1-5) of the RAID stripe set (e.g., RAID Stripes 0-5), RAID conversion process 200 may copy 216 data currently stored on a specific drive, chosen from the N data drives and P parity drives, within a specific RAID stripe of the RAID stripe set to the P+1 parity drive of the specific RAID stripe.

For example, RAID conversion process 200 may:
copy 216 data currently stored on Drive 4 within RAID stripe 1 of the RAID stripe set to Drive 5 (i.e., storage target 126);
copy 216 data currently stored on Drive 3 within RAID stripe 2 of the RAID stripe set to Drive 5 (i.e., storage target 126);
copy 216 data currently stored on Drive 2 within RAID stripe 3 of the RAID stripe set to Drive 5 (i.e., storage target 126);
copy 216 data currently stored on Drive 1 within RAID stripe 4 of the RAID stripe set to Drive 5 (i.e., storage target 126); and
copy 216 data currently stored on Drive 0 within RAID stripe 5 of the RAID stripe set to Drive 5 (i.e., storage target 126).

Further and when relocating 210 the remaining new parity portions, chosen from the plurality of new parity portions, across the N data drives (e.g., Drives 0-3) and P parity drives (e.g., Drive 4) within the remaining RAID stripes (e.g., RAID Stripes 1-5) of the RAID stripe set (e.g., RAID Stripes 0-5), RAID conversion process 200 may calculate 218 a specific new parity portion for the specific RAID stripe of the RAID stripe set; and store 220 the specific new parity portion for the specific RAID stripe of the RAID stripe set on the specific drive. For example, RAID conversion process 200 may:
calculate 218 parity portion Q for RAID stripe 1 (of the RAID stripe set) and store 220 parity portion Q for RAID stripe 1 (of the RAID stripe set) on Drive 4;
calculate 218 parity portion Q for RAID stripe 2 (of the RAID stripe set) and store 220 parity portion Q for RAID stripe 2 (of the RAID stripe set) on Drive 3;
calculate 218 parity portion Q for RAID stripe 3 (of the RAID stripe set) and store 220 parity portion Q for RAID stripe 3 (of the RAID stripe set) on Drive 2;
calculate 218 parity portion Q for RAID stripe 4 (of the RAID stripe set) and store 220 parity portion Q for RAID stripe 4 (of the RAID stripe set) on Drive 1; and
calculate 218 parity portion Q for RAID stripe 5 (of the RAID stripe set) and store 220 parity portion Q for RAID stripe 5 (of the RAID stripe set) on Drive 0.

When calculating 218 a specific new parity portion (e.g., Q within RAID Stripes 1-5), various algorithms may be used by RAID conversion process 200, examples of which may include but are not limited to: dual check data computations (e.g., parity and Reed-Solomon), orthogonal dual parity check data, and diagonal parity.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
receiving a request to reconfigure a data array that currently includes N data drives and P parity drives to include N data drives and P+1 parity drives, wherein original parity portions of the data array are arranged in an increasing order based on the number of N data drives and P parity drives across Redundant Array of Independent Disks (RAID) stripes of a RAID stripe set, wherein the N data drives and the P parity drives include N data portions and P parity portions;

confirming the availability of the P+1 parity drive;
distributing a plurality of new parity portions across the N data drives and P+1 parity drives; and
relocating one of an original parity portion and an original data portion chosen from a plurality of P parity portions and N data portions associated with the P parity drives and the N data drives once per RAID stripe of the RAID stripe set to the P+1 parity drive in a decreasing order across the plurality of RAID stripes of the RAID stripe set based on the N data drives and the P+1 parity drives, wherein distributing the plurality of new parity portions includes writing the new parity portions to an original location of the relocated original parity portion or original data portion per RAID stripe of the RAID stripe set.

2. The computer-implemented method of claim 1 wherein receiving a request to reconfigure a data array that currently includes N data drives and P parity drives to include N data drives and P+1 parity drives concerns reconfiguring a RAID 5 data array to a RAID 6 data array.

3. The computer-implemented method of claim 2 wherein:
the RAID 5 data array includes N data drives and one parity drive; and
the RAID 6 data array includes N data drives and two parity drives.

4. The computer-implemented method of claim 1 further comprising maintaining a first new parity portion, chosen from the plurality of new parity portions, on the P+1 parity drive within a first RAID stripe of a RAID stripe set, wherein maintaining a first new parity portion, chosen from the plurality of new parity portions, on the P+1 parity drive within a first RAID strip of a RAID strip set includes:
calculating the first new parity portion for the first RAID stripe of the RAID stripe set; and
storing the first new parity portion for the first RAID stripe of the RAID stripe set on the P+1 parity drive.

5. The computer-implemented method of claim 1 further comprising:
copying data currently stored on a specific drive, chosen from the N data drives and P parity drives, within a specific RAID stripe of the RAID stripe set to the P+1 parity drive of the specific RAID stripe.

6. The computer-implemented method of claim 5 further comprising:
calculating a specific new parity portion for the specific RAID stripe of the RAID stripe set; and
storing the specific new parity portion for the specific RAID stripe of the RAID stripe set on the specific drive.

7. The computer-implemented method of claim 6, wherein calculating a specific new parity portion for the specific RAID stripe of the RAID stripe set includes using a dual check data computation, orthogonal dual parity check data, and diagonal parity.

8. The computer-implemented method of claim 7, wherein the dual check data computation includes one or more of parity and Reed-Solomon.

9. A computer program product residing on a non-transitory computer readable medium having a plurality of instructions stored thereon which, when executed by a processor, cause the processor to perform operations comprising:
receiving a request to reconfigure a data array that currently includes N data drives and P parity drives to include N data drives and P+1 parity drives, wherein original parity portions of the data array are arranged in an increasing order based on the number of N data drives and P parity drives across Redundant Array of Independent Disks (RAID) stripes of a RAID stripe set, wherein the N data drives and the P parity drives include N data portions and P parity portions;
confirming the availability of the P+1 parity drive;
distributing a plurality of new parity portions across the N data drives and P+1 parity drives; and
relocating one of an original parity portion and an original data portion chosen from a plurality of P parity portions and N data portions associated with the P parity drives and the N data drives once per RAID stripe of the RAID stripe set to the P+1 parity drive in a decreasing order across the plurality of RAID stripes of the RAID stripe set based on the N data drives and the P+1 parity drives, wherein distributing the plurality of new parity portions includes writing the new parity portions to an original location of the relocated original parity portion or original data portion per RAID stripe of the RAID stripe set.

10. The computer program product of claim 9 wherein receiving a request to reconfigure a data array that currently includes N data drives and P parity drives to include N data drives and P+1 parity drives concerns reconfiguring a RAID 5 data array to a RAID 6 data array.

11. The computer program product of claim 10 wherein:
the RAID 5 data array includes N data drives and one parity drive; and
the RAID 6 data array includes N data drives and two parity drives.

12. The computer program product of claim 9 further comprising maintaining a first new parity portion, chosen from the plurality of new parity portions, on the P+1 parity drive within a first RAID stripe of a RAID stripe set, wherein maintaining a first new parity portion, chosen from the plurality of new parity portions, on the P+1 parity drive within a first RAID strip of a RAID strip set includes:
calculating the first new parity portion for the first RAID stripe of the RAID stripe set; and
storing the first new parity portion for the first RAID stripe of the RAID stripe set on the P+1 parity drive.

13. The computer program product of claim 9 further including:
copying data currently stored on a specific drive, chosen from the N data drives and P parity drives, within a specific RAID stripe of the RAID stripe set to the P+1 parity drive of the specific RAID stripe.

14. The computer program product of claim 13 further including:
calculating a specific new parity portion for the specific RAID stripe of the RAID stripe set; and
storing the specific new parity portion for the specific RAID stripe of the RAID stripe set on the specific drive.

15. A computing system including a processor and memory configured to perform operations comprising:
receiving a request to reconfigure a data array that currently includes N data drives and P parity drives to include N data drives and P+1 parity drives, wherein original parity portions of the data array are arranged in an increasing order based on the number of N data drives and P parity drives across Redundant Array of Independent Disks (RAID) stripes of a RAID stripe set, wherein the N data drives and the P parity drives include N data portions and P parity portions;
confirming the availability of the P+1 parity drive;

distributing a plurality of new parity portions across the N data drives and P+1 parity drives; and relocating one of an original parity portion and an original data portion chosen from a plurality of P parity portions and N data portions associated with the P parity drives and the N data drives once per RAID stripe of the RAID stripe set to the P+1 parity drive in a decreasing order across the plurality of RAID stripes of the RAID stripe set based on the N data drives and the P+1 parity drives, wherein distributing the plurality of new parity portions includes writing the new parity portions to an original location of the relocated original parity portion or original data portion per RAID stripe of the RAID stripe set.

16. The computing system of claim 15 wherein receiving a request to reconfigure a data array that currently includes N data drives and P parity drives to include N data drives and P+1 parity drives concerns reconfiguring a RAID 5 data array to a RAID 6 data array.

17. The computing system of claim 16 wherein:
the RAID 5 data array includes N data drives and one parity drive; and
the RAID 6 data array includes N data drives and two parity drives.

18. The computing system of claim 15 further comprising maintaining a first new parity portion, chosen from the plurality of new parity portions, on the P+1 parity drive within a first RAID stripe of a RAID stripe set, wherein maintaining a first new parity portion, chosen from the plurality of new parity portions, on the P+1 parity drive within a first RAID strip of a RAID strip set includes:
calculating the first new parity portion for the first RAID stripe of the RAID stripe set; and
storing the first new parity portion for the first RAID stripe of the RAID stripe set on the P+1 parity drive.

19. The computing system of claim 15 further comprising:
copying data currently stored on a specific drive, chosen from the N data drives and P parity drives, within a specific RAID stripe of the RAID stripe set to the P+1 parity drive of the specific RAID stripe.

20. The computing system of claim 19 further comprising:
calculating a specific new parity portion for the specific RAID stripe of the RAID stripe set; and
storing the specific new parity portion for the specific RAID stripe of the RAID stripe set on the specific drive.

* * * * *